United States Patent [19]
Choi

[11] Patent Number: 5,474,601
[45] Date of Patent: Dec. 12, 1995

[54] INTEGRATED FLOATING PLATFORM VERTICAL ANNULAR SEPARATION AND PUMPING SYSTEM FOR PRODUCTION OF HYDROCARBONS

[75] Inventor: Michael S. Choi, Houston, Tex.

[73] Assignee: Conoco Inc., Ponca City, Okla.

[21] Appl. No.: 284,962

[22] Filed: Aug. 2, 1994

[51] Int. Cl.⁶ .................................................. B01D 19/00
[52] U.S. Cl. ............................. 96/182; 96/195; 96/208; 96/209; 166/105.3; 166/105.5; 166/354; 166/357
[58] Field of Search .................... 96/155, 182, 187–195, 96/206–214; 166/105.3, 105.5, 106, 265, 352, 354, 357

[56] References Cited

U.S. PATENT DOCUMENTS

| | | | |
|---|---|---|---|
| 1,279,758 | 9/1918 | Putnam . | |
| 1,628,900 | 5/1926 | Neilsen . | |
| 2,349,164 | 7/1942 | Gilbert | 166/105.5 X |
| 2,398,339 | 4/1945 | Watts . | |
| 2,429,043 | 10/1947 | Barnhart . | |
| 2,652,130 | 6/1950 | Ferguson . | |
| 2,843,053 | 3/1956 | Carle . | |
| 3,048,122 | 12/1959 | Hansen . | |
| 3,128,719 | 5/1961 | Jongbloed et al. . | |
| 3,291,057 | 11/1964 | Carle . | |
| 3,336,732 | 8/1967 | Carroll | 96/206 |
| 3,516,490 | 3/1969 | Smalling et al. . | |
| 3,608,630 | 9/1971 | Wooden et al. . | |
| 3,624,822 | 11/1971 | Carle et al. | 417/313 |
| 3,688,473 | 9/1972 | Brown | 55/38 |
| 3,718,183 | 2/1973 | Scott . | |
| 3,760,875 | 9/1973 | Busking | 166/359 X |
| 3,822,533 | 7/1974 | Oranje | 55/394 |
| 3,887,342 | 6/1975 | Bunnelle | 55/203 |
| 3,893,918 | 7/1975 | Favret, Jr. | 210/84 |
| 3,988,132 | 10/1978 | Oranje | 55/399 |
| 4,072,481 | 2/1978 | Laval, Jr. | 96/182 |
| 4,074,763 | 2/1978 | Stevens | 166/325 |
| 4,148,735 | 4/1979 | Laval, Jr. | 210/512.1 |
| 4,217,211 | 8/1980 | Crane | 210/7 |
| 4,229,191 | 10/1980 | Moore | 55/203 |
| 4,231,767 | 11/1980 | Acker | 96/190 X |
| 4,273,472 | 6/1981 | Plazza et al. | 405/211 |
| 4,339,306 | 7/1982 | Janusch | 159/15 |
| 4,386,654 | 6/1983 | Becker | 166/105.5 |

(List continued on next page.)

FOREIGN PATENT DOCUMENTS

| | | | |
|---|---|---|---|
| 0018840 | 5/1980 | European Pat. Off. . | |
| 0147215 | 12/1984 | European Pat. Off. . | |
| 1227128 | 4/1968 | United Kingdom . | |
| 1233347 | 4/1968 | United Kingdom . | |
| 1458071 | 1/1974 | United Kingdom . | |
| 2177017 | 1/1987 | United Kingdom | 96/155 |

OTHER PUBLICATIONS

OTC 6768, "The Current State of Development of The VASPS Subsea Separation and Pumping System," J. H. Entress, Baker Jardine & Assoc. etc.; Presented at the 23rd Annual OTC in Houston, Texas May 6–9, 1991, pp. 627–635.

SPE 20698, "Application of Subsea Separation and Pumping to Marginal and Deepwater Field Developments," A. C. Baker etc., presented at the 65th Annual Technical Conference and Exhibition of the Society of Petroleum Engineers held in New Orleans, La. Sep. 23–26, 1990, pp. 783–789.

Ocean Industry, Nov. 1989, "Subsea Separator Gets First North Sea Test," pp. 38–40.

*Primary Examiner*—Robert Spitzer
*Attorney, Agent, or Firm*—John E. Holder

[57] ABSTRACT

A VASPS (vertical annular separation and pumping system) is integral with a floating production vessel such as a TLP. The head section of the VASPS is located at the deck level of the vessel. The tail section is located at or near the bottom of the body of water. The head and tail sections are in fluid communication by a riser having at least two fluid passageways (conductors). The invention constitutes an improvement on the VASPS unit described and claimed in U.S. Pat. No. 4,900,433.

9 Claims, 4 Drawing Sheets

U.S. PATENT DOCUMENTS

| | | | |
|---|---|---|---|
| 4,390,351 | 6/1983 | Matsui et al. | 55/204 |
| 4,424,068 | 1/1984 | McMillan | 96/189 X |
| 4,481,020 | 11/1984 | Lee et al. | 55/203 |
| 4,531,584 | 7/1985 | Ward | 166/265 |
| 4,626,360 | 12/1986 | Senyard et al. | 210/799 |
| 4,676,308 | 6/1987 | Chow et al. | 166/369 |
| 4,705,114 | 11/1987 | Schroeder et al. | 166/357 |
| 4,718,824 | 1/1988 | Cholet et al. | 417/14 |
| 4,805,697 | 2/1989 | Fouillout | 166/265 |
| 4,816,146 | 3/1989 | Scherter | 210/104 |
| 4,848,475 | 7/1989 | Dean et al. | 166/357 |
| 4,900,433 | 2/1990 | Dean et al. | 210/170 |
| 4,981,175 | 1/1991 | Powers | 166/265 |
| 4,982,794 | 1/1991 | Houot | 166/357 |
| 5,389,128 | 2/1995 | Lopes | 96/207 |

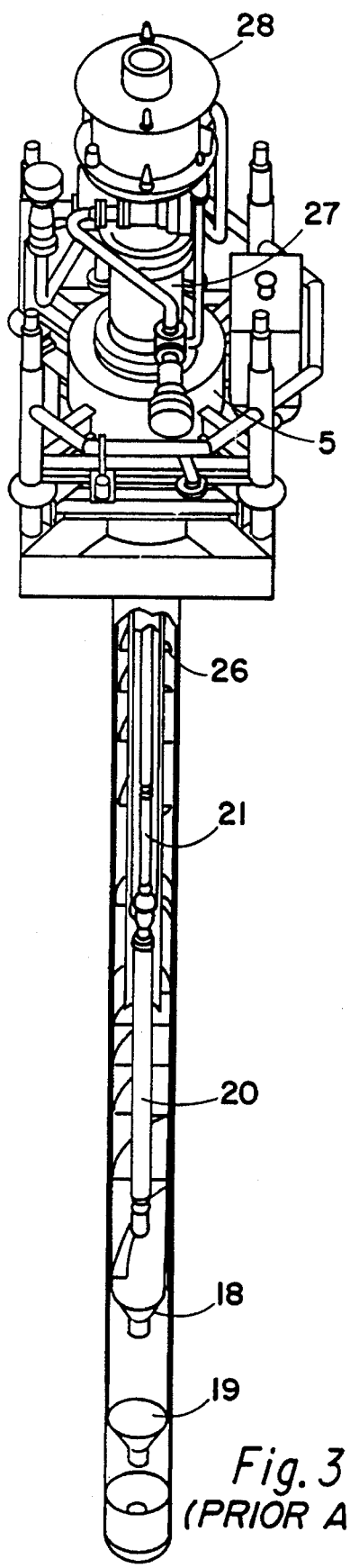
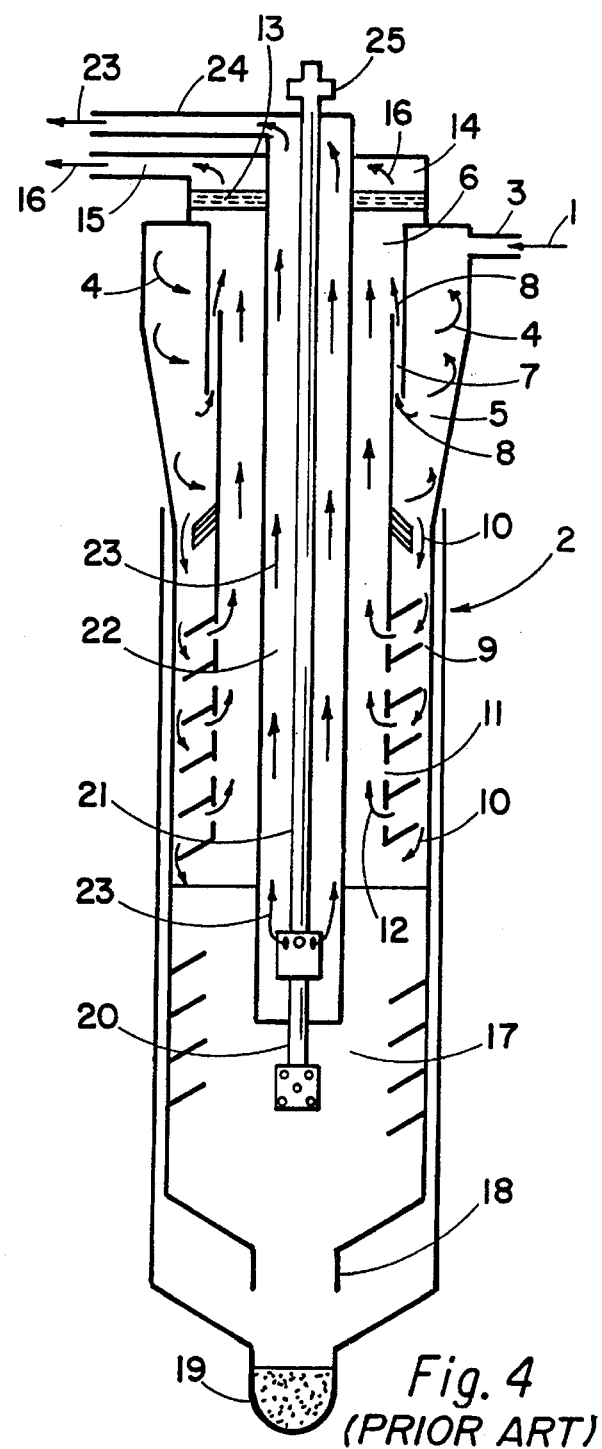
Fig. 3 (PRIOR ART)
Fig. 4 (PRIOR ART)

INTEGRATED FLOATING PLATFORM VERTICAL ANNULAR SEPARATION AND PUMPING SYSTEM FOR PRODUCTION OF HYDROCARBONS

DESCRIPTION

1. Technical Field

This invention relates to the art of producing hydrocarbons from subterranean formations located beneath bodies of water.

2. Background of the Invention

With the gradual depletion of hydrocarbon reserves, there has been considerable attention attracted to the drilling and production of oil and gas wells located in water. In relatively shallow waters wells may be drilled in the ocean floor from bottom founded, fixed platforms. Because of the large size of the structure needed to support drilling and production facilities in ever deeper water, bottom founded structures are limited to water depths of less than about 1000–1200 feet. In deeper water, floating drilling and production systems have been used in order to reduce the size, weight, and cost of deep water drilling and production structures.

A type of drilling facility, which has gained considerable attention recently, is the so called tension leg platform (TLP). The vertical tension legs are located at or within the corner columns of the semi-submersible platform structure. The tension legs are maintained in tension at all times by insuring that the buoyancy of the TLP exceeds its operating weight under all environmental conditions. When the buoyant force of the water displaced by the platform/structure at a given depth exceeds the weight of the platform/structure (and all of its internal contents), there is a resultant "excess buoyant force" that is carried as the vertical component of tensions in the mooring elements (and risers). When stiffly elastic continuous tension leg elements called tendons are attached between a rigid sea floor foundation and the corners of the floating hull, they effectively restrain vertical motions due to heave, pitch, and roll inducing forces while there is a compliant restraint of movement in the horizontal plane, that is, surge, sway and yaw. Thus, a tension leg platform provides a very stable floating offshore structure for supporting equipment and carrying out functions related to oil production. Conoco's Hutton platform in the North Sea is the first commercial example of a TLP. Saga's Snorre platform is a later example of a TLP.

The primary interest in the TLP concept is that stiff restraint of vertical motions makes it possible to tie back wells drilled into the sea floor to production facilities on the surface through a collection of pressure containment apparatuses (e.g., the valves of a well "tree") such that the "tree" is located above the body of water within the dry confines of the platform's well bay. However, for installations in deeper and deeper water, a tension leg platform must become larger and more complex in order to support a plurality of extremely long and increasingly heavy tension legs and/or the tension legs themselves must incorporate some type of buoyancy to reduce their weight relative to the floating structure. Such considerations add significantly to the cost of a deep water TLP installation. Conoco's Jolliet TLWP (tension leg well platform) in the Gulf of Mexico addresses this problem by siting production equipment on a nearby conventional platform in shallower water. However, this approach is limited to locations that have sites relatively nearby for the production equipment.

In addition, in ever deeper water, a greater percentage of the hull displacement must be dedicated to access buoyancy (i.e., tendon pretension) to restrict horizontal offset. Station-keeping is a key role for the mooring system. The vertical tension leg mooring system provides the capacity to hold position above a fixed point on the sea floor as any horizontal offset of the platform creates a horizontal restoring force component in the angular deflection of the tendon tension vector. In ever deeper water, it requires greater tendon pretension to provide enough restoring force to keep the TLP within acceptable offset limits. This increase leads to larger and larger minimum hull displacements. As in air craft and motor vehicle design, there is a multiplying effect. That is, each unit of additional weight requires additional structural weight to support it which in turn requires still more weight or mass of the structure. Thus, any decrease in weight or mass of essential elements leads to considerable savings. Similar effects are noted for other floating platforms such as hybridly moored platforms, semi-submersible platforms, etc.

There continues to be a compelling need for improved platforms and drilling systems, particularly those which are less costly and safer, for production of hydrocarbons from beneath relatively deep water, particularly water depths of 500 feet to 8,000 feet, and more particularly 1,000 to 4,000 feet. Unless this need is satisfied, only very rich reservoirs will support development at such relatively great depths. Therefore, it is appropriate to examine all aspects of deep water drilling and production systems in order to identify those features which are most sensitive to increasing water depths. In this regard, it is necessary to give careful consideration to well systems.

If ways can be found to get heavy production equipment off floating systems, particularly TLPs, very large savings can be effected and deep water reservoirs from which production is not now economically viable can be produced.

Another approach to producing hydrocarbons from beneath relatively deep water involves use of subsea production systems. Pioneering work on this approach has been done by many organizations, particularly by Petrobras in Brazil. One promising approach is the VASPS (vertical annular separation and pumping system) pioneered by British Petroleum and disclosed in U.S. Pat. No. 4,900,433. Further refinements are disclosed in OTC 6768 "The Current State Of Development Of The VASPS Subsea Separation And Pumping System" by J. H. Entress, Baker Jardine & Assocs.; D. L. Pridden, Mentor Engineering Consultants; and A. C. Baker, Baker Jardine & Assocs. presented at the 23rd Annual OTC in Houston, Tex., May 6–9, 1991 and SPE 20698 "Application Of Subsea Separation And Pumping To Marginal And Deepwater Field Developments" by A. C. Baker, BJA-Mentor Production Systems Ltd., and D. C. Lucas-Clements, Barker Jardine & Assocs, Ltd., presented at the 65th Annual Technical Conference and Exhibition held in New Orleans, La. Sep. 23–26, 1990. Also, a promising subsea separator is being developed by BOET as disclosed in Ocean Industry, November, 1989, pages 38–40.

The state-of-the-art is further disclosed in the following references: U.S. Pat. No. 4,848,475; U.K. 1,458,071; U.K. 1,227,128; European Patent 18,840; U.S. Pat. Nos. 3,048, 122; 3,291,057; 3,608,630; 3,624,822; 3,688,473; 3,887, 342; 4,148,735; 4,217,211; 4,481,020; 4,531,584; 4,705, 114; 4,805,697; 4,816,146; 4,982,794; 2,429,043; 4,718, 824; 4,386,654; 3,893,918; 4,626,360; 4,273,472; 4,339, 306; 4,676,308; 4,074,763; 4,148,735; 3,822,533; 3,988, 132; U.K. 1,233,347; U.S. Pat. No. 4,229,191; 4,390,351; and European 147,215.

The invention of this application provides a substantial advance in the art exemplified above in that a modified VASPS unit is integrally installed with a floating production vessel to obtain the advantages of both a subsea production system and a floating production vessel such as a TLP.

SUMMARY OF THE INVENTION

The invention provides a system for producing hydrocarbons from a reservoir located below the bottom of a body of water. The system comprises a floating production vessel such as a tension leg platform (TLP). It also comprises a vertical annular separation and pumping system (VASPS) having a head section and a tail section. The head section which comprises a liquid hydrocarbon outlet in fluid communication with a first conductor and a gas outlet in fluid communication with a second conductor is located above the surface of the water in association with the vessel. The tail section which comprises an outer casing forming the outer shell of the tail section, two sets of concentric tubing within the outer casing which together with the outer casing provide two annuli and a central passage. One annulus has an inlet to receive a mixture of liquid hydrocarbon and gas from a subsea well and the other annulus has an outlet for separated gas in fluid communication with the second conductor. The second passage has an outlet in fluid communication with the first conductor. The tail section also has an electrical or hydraulic pump at the base of the central passage thereof. The head and tail sections are in fluid communication by means of the first conductor and the second conductor. The pump is connected to the head section by a pump drive means such as an electrical conductor or a tubular for power fluid.

In one presently preferred mode, the production vessel comprises a tension leg platform (TLP).

In another presently preferred mode, the first conductor and the second conductor comprise a riser which is tensioned.

In yet another presently preferred mode, the tail section is located in a dummy well generally below the TLP on the bottom in association with a template.

In yet another presently preferred mode, the first conductor is the inner passageway of a tubular and the second conductor is the annulus between the first tubular and a second tubular which is disposed concentric to the first tubular.

The present invention provides a deep water production system with numerous advantages. Advantages of the invention include the following: Installation cost of the VASPS unit is greatly decreased by use of the TLP drilling rig. A single multiphase pipeline which may be connected to the VASPS in the "dry" and installed by laying away from the floating platform can be employed. For satellite production, subsea flow line and dynamic risers (gas and liquid) to transport the produced fluids to the TLP can be eliminated. For TLP wells, elimination of individual risers and improved productivity by reducing back pressure to the reservoir due to the static head of the liquid column in the risers can be effected. Pump control and power supply systems can be simplified. The TLP drilling rig can be employed for maintenance. The load for which the TLP or other floating vessel must be designed can be very substantially decreased with consequent decrease in cost.

The invention solves a number of problems associated with use of the subsea VASPS concept to produce remote wells. In accordance with such practice, separated gas is transported by pipeline to the host platform under natural pressure while the pumped liquid flows in a separate flow line. At the floating host platform dynamic risers are typically used to connect the sea bed pipelines to the facilities on the deck. In addition to high initial costs, the disadvantages associated with the conventional VASPS system are lack of a reliable subsea high voltage electrical connector for the VASPS pump, and the high cost of pump repairs (requiring the mobilization of a semi-submersible drilling rig to access the pump). The invention of this application overcomes these disadvantages.

BRIEF DESCRIPTION OF THE DRAWINGS

The objects of the invention will be apparent from the following description taken in conjunction with the drawings which form part of this specification. A brief description of the drawings follows:

FIG. 3 is a semi-schematic partially cut away side view of a conventional VASPS unit.

FIG. 4 is a cross-sectional semi-schematic side view of a conventional VASPS unit which better clarifies how the unit works.

DETAILED DESCRIPTION OF THE INVENTION

Figure 1:
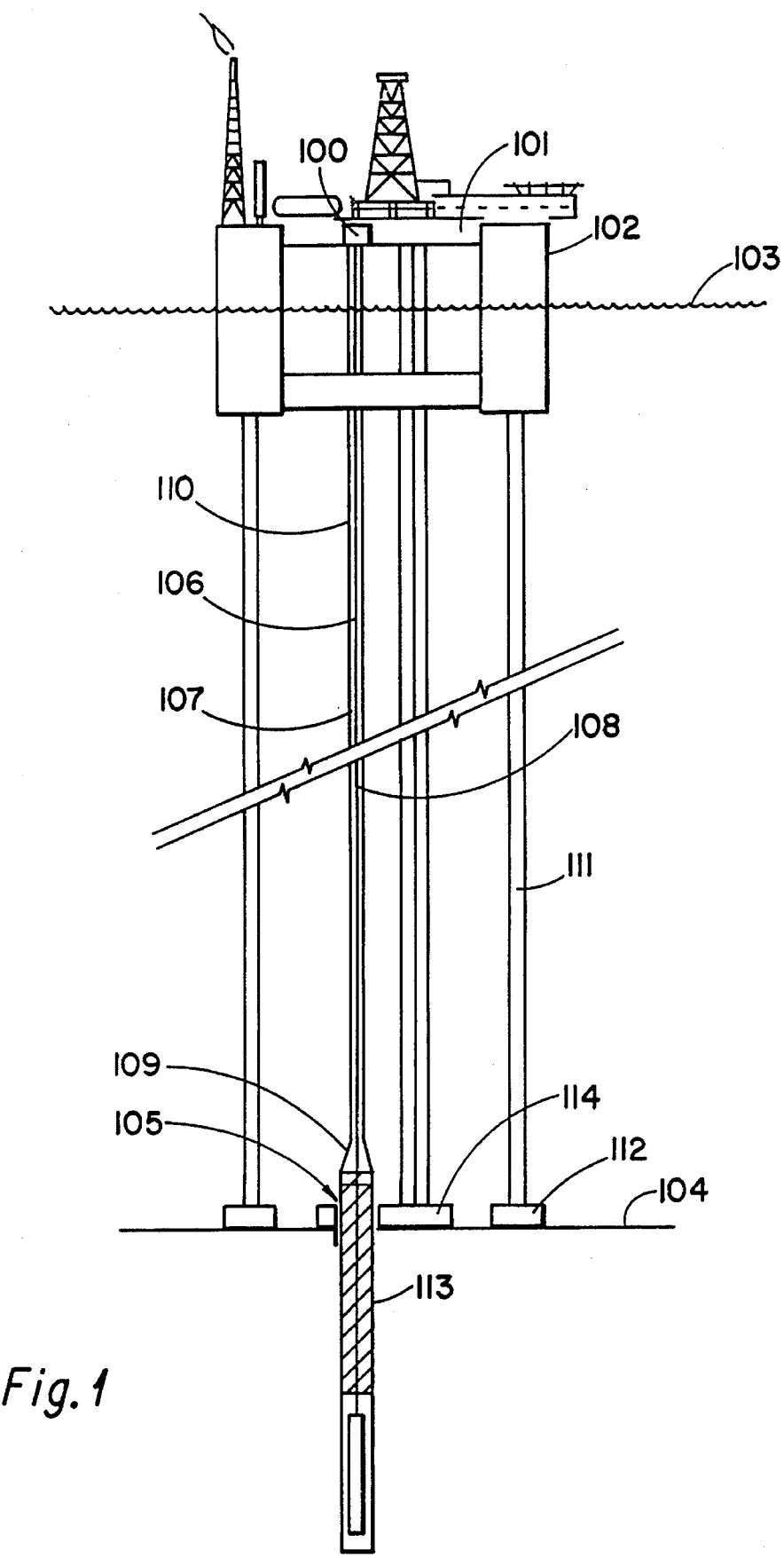
FIG. 1. is a simplified semi-schematic cross-sectional side view of the "long neck VASPS" of the invention sited with a generic tension leg platform (TLP).

In order to most expeditiously disclose the invention of this application, as exemplified by a presently preferred mode thereof, attention is called to the prior art relating to a conventional VASPS unit. This is found in U.S. Pat. No. 4,900,433, issued Feb. 13, 1990, assigned to British Petroleum Company. The primary reference is supplemented by Entress et al. "The Current State Of Development Of The VASPS Subsea Separation And Pumping System," OTC 6768, presented at the 23rd Annual Offshore Technology Conference in Houston, Tex., May 6–9, 1991 and Baker et al., "Application Of Subsea Separation And Pumping To Marginal And Deep Water Field Developments" SPE 20698, presented at the 65th Annual Technical Conference and Exhibition Of The Society Of Petroleum Engineers held in New Orleans, Louisiana, Sep. 23–26, 1990. Copies of these references are filed with this application and these references are incorporated by reference herewith.

A brief description of the workings of a refined VASPS as disclosed by the foregoing references is provided in FIGS. 3 and 4 in combination with the following brief description.

Thus, referring to FIG. 4, production fluids 1 which can comprise oil, gas, and sand, enter VASPS unit 2 via tangential inlet 3 such as to impart a swirling motion designated by arrows 4 in inlet hydrocyclone 5 to effect primary separation of the gas from the oil, the primarily separated gas passing into annulus 6 through inlet 7 as shown by arrows 8. The heavier oil and sand as well as unseparated gas pass to spiral separator section 9 as shown by arrows 10. The centrifugal effects of the spiral separator cause the remaining gas to pass into annulus 6 via apertures 11 as shown by arrows 12. The separated gas in annulus 6 passes upwardly through gas scrubber/de-mister 13 to utilization via manifold 14 and outlet 15 as shown by arrows 16. The separated sand and oil passes to liquid sump 17 wherein the sand is separated by the sand cyclone 18 and passes to sand sump 19. Oil is pumped from liquid sump 17 via a submersible pump 20 powered by pump motor 21 and up tubular 22 as shown by arrows 23 so as to pass to utilization via outlet 24. An electric power supply 25 powers the pump motor 21.

The more detailed semi-schematic of FIG. 3 is disclosed to further aid an understanding of the prior art VASPS concept which is more thoroughly disclosed in the references which are incorporated by reference. The numbers shown in FIG. 3 correspond to the same features in FIG. 4. Additionally, spiral separator joints 26, a separator head 27, and a separator cap 28 are shown.

Figure 2A:
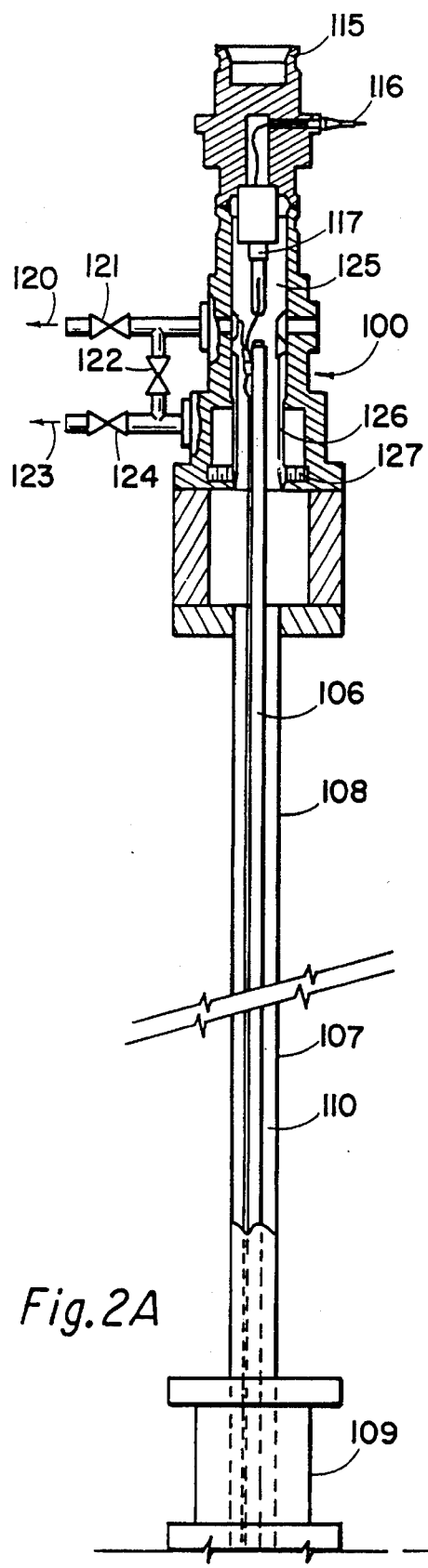
FIGS. 2A and 2B are a simplified semi-schematic cross-sectional side view of a presently preferred mode of the "long neck VASPS" of the invention.
Figure 2A:
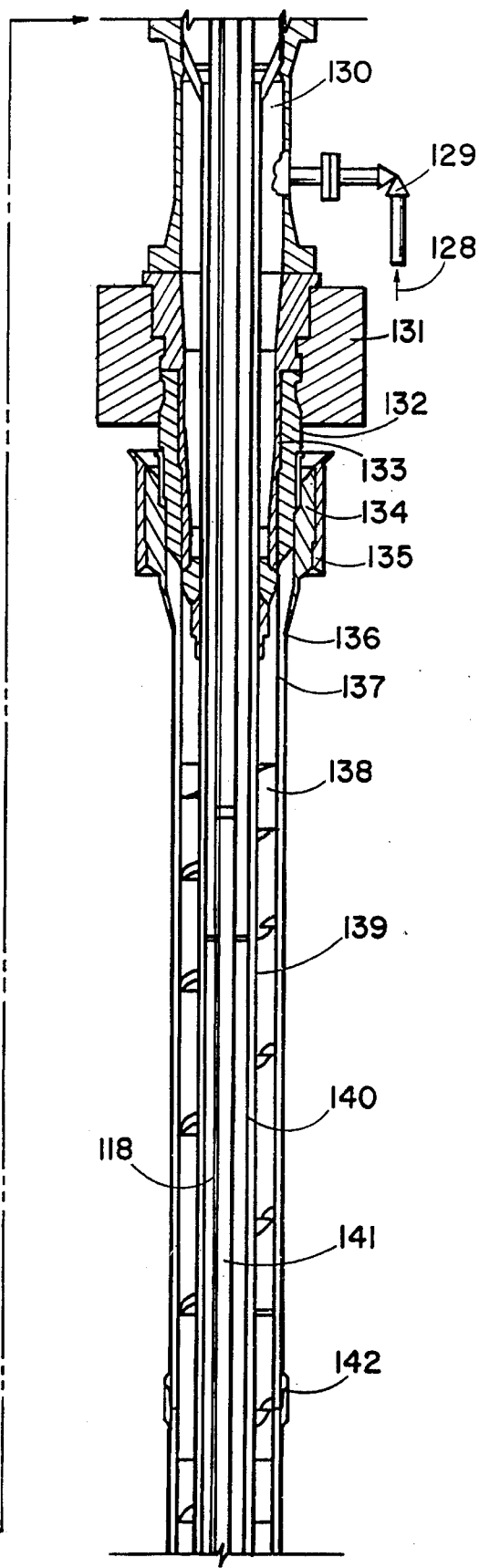
Figure 2B:
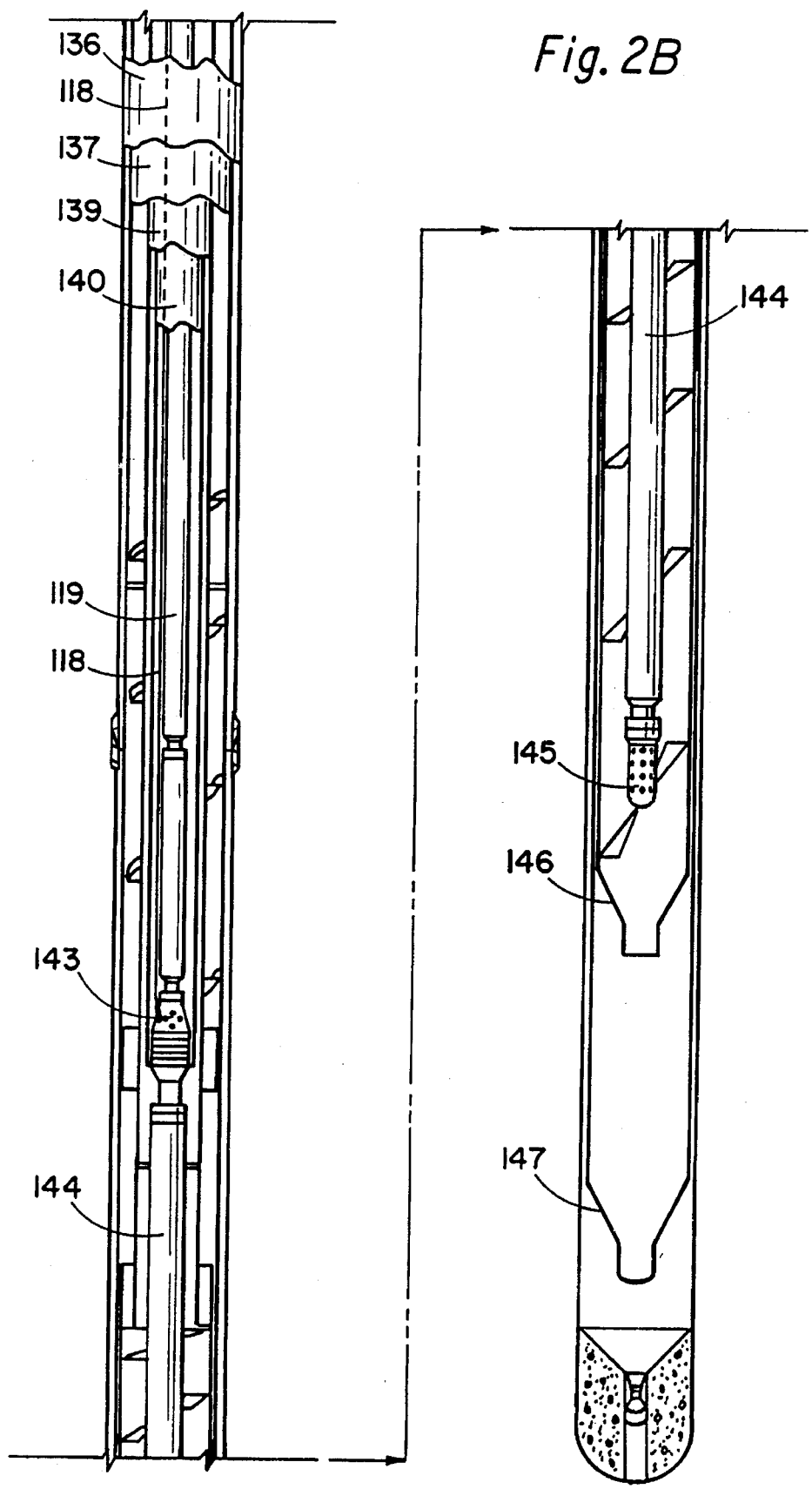

In view of the foregoing brief summation of prior art VASPS, the invention of this application is disclosed and exemplified as follows:

Referring to FIGS. 1, 2A and 2B, a head section 100 of the "long neck VASPS" is sited on deck 101 of tension leg platform (TLP) 102 floating on body of water 103 having bottom 104. The head section 100 is connected to tail section 105 by way of a tubing string 106 and a conductor 107 together comprising a tensioned riser 108 and a stress joint 109, that is, the "long neck" of the invention of this application. Fluid communication between the head section and the tail section is effected via the tubular 106 and the annulus 110 between tubular 106 and conductor 107.

The TLP 102 is moored via tendons 111 to anchor means 112 affixed to the floor of the body of water 104. The tail section of 105 of the VASPS unit is sited in dummy well 113 positioned in well template 114. The tendons 111 are under sufficient tension that they will not go slack in a design storm, typically a 100 year storm.

Now referring more particularly to FIGS. 2A and 2B, the head section 100 of the "long neck" VASPS unit of the invention comprises a separator head cap 115, an electric power supply 116, a power connector 117, and a power cable 118 (shown for simplicity only in the tail section 105 but connecting to the pump motor 119 in the tail section by being clamped to the tubular 106). The head section 100 also comprises an oil outlet 120 and an oil control valve 121 as well as a cross-over valve 122, a gas outlet 123, and a gas control valve 124.

Tubular 106 terminates in chamber 125 establishing fluid communication to oil outlet 120 and is integral with a tubing/cable pump hanger with pack-off 126. Conductor 107 has its upper termination in production casing hanger with pack-off and provides fluid communication with gas outlet 120 through annulus 110 to the tail section 105 through gas de-mister 127.

Below stress joint 109, the tail section 105 comprises production inlet 128 in fluid communication via valve 129 to gas expansion chamber 130 associated with separator head connector 131 and wellhead housing 132 and in fluid communication with cyclone 133 in housing 134. Housing 134 is sited in housing receptacle guide base 135 mounted in association with conductor 136 and casing 137. Separator joint 139, gas conduit 140, oil conduit 141, and conductor threaded connection 142 are sited in the tail section of the unit as shown. Packer pump discharge 143 and polished bore receptacle 144 are sited as shown. Pump 143, pump intake 145, and sand cyclone 146 are also disposed as shown, as is casing debris sump 147.

Other features analogous to the prior art are shown and their use and disposition are analogous to those of the prior art and will be appreciated by those skilled in the art. In use, the tail section 105 operates in the manner shown in FIG. 4 with the submersible pump bringing oil up the center of the tubular 106 and gas up the annulus 110 for separated production via gas outlet 123 and oil outlet 120. Siting the head section on a floating structure such as TLP 102 and the tail section at or near the floor of the body of water 104 enables the new and highly advantageous results otherwise described in the application to be obtained.

The above exemplification is provided to enable those skilled in the art to understand the invention of this application. However, it should not be construed as limiting the invention as set out in the claims and equivalents hereof.

I claim:

1. A system for producing hydrocarbons from a reservoir located below the bottom of a body of water having a surface having:

(a) a floating production vessel and
    (b) a vertical annular separation and pumping system (VASPS) having a head section and a tail section; wherein the improvement comprises:
    the head section (which has (1) a liquid hydrocarbon outlet in fluid communication with a first conductor and (2) a gas outlet in fluid communication with a second conductor) is located above the surface of the water in association with the vessel and
    the tail section (which has (3) an outer casing forming the outer shell of the tail section, (4) two sets of concentric tubing within the outer casing, providing with the outer casing, two annuli and a central passage, one annulus having an inlet to receive a mixture of liquid hydrocarbon and gas, the other annulus having an outlet for separated gas in fluid communication with the second conductor, and the central passage having an outlet in fluid communication with the first conductor, and (5) an electrical or hydraulic pump at the base of the central passage) is located at or near the bottom,
    the head and tail sections being in fluid communication by means of the first conductor and the second conductor, and the pump being connected by a pump drive means to the head section.

2. The system of claim 1 wherein the improvement further comprises the floating production vessel having tethers connected to the bottom and tensioned such as to comprise a tension leg platform (TLP), the first conductor and the second conductor comprise a riser which is tensioned, by a tensioning means, and the tail section is located in a dummy well generally below the TLP on the bottom.

3. The system of claim 2 wherein the first conductor and the second conductor comprising the riser comprise concentric tubulars, the interior of the first tubular comprising the first conductor and the annulus between the tubulars comprising the second conductor.

4. The system of claim 2 wherein the annulus having the inlet to receive a mixture of liquid hydrocarbon and gas has means for applying a swirling motion to the mixture.

5. The system of claim 4 wherein the means has at least one helix.

6. The system of claim 5 wherein the helix is of varying pitch along its length.

7. The system of claim 4 wherein the means is a tangential inlet for the mixture of liquid hydrocarbon and gas and/or a cyclone within the annulus.

8. The system of claim 1 wherein the first conductor and the second conductor comprise a tensioned riser which is tensioned by a tensioning means.

9. The system of claim 1 characterized in that the floating production vessel has tethers connected to the bottom and tensioned such as to comprise a tension leg platform (TLP) and the first conductor and the second conductor comprise a riser which is tensioned.

* * * * *